United States Patent [19]
Yap

[11] Patent Number: 5,500,033
[45] Date of Patent: Mar. 19, 1996

[54] MELT HEATING METHOD

[75] Inventor: Loo T. Yap, Princeton, N.J.

[73] Assignee: The BOC Group, Inc., New Providence, N.J.

[21] Appl. No.: 394,866

[22] Filed: Feb. 27, 1995

Related U.S. Application Data

[63] Continuation-in-part of Ser. No. 376,278, Jan. 23, 1995, abandoned.

[51] Int. Cl.$^6$ ..................................................... C22B 21/00
[52] U.S. Cl. .................. 75/386; 75/387; 75/686; 75/672; 75/709
[58] Field of Search ............................ 75/386, 387, 686, 75/687, 672, 709

[56] References Cited

U.S. PATENT DOCUMENTS 5,299,929  4/1994  Yap .............................................. 431/8

*Primary Examiner*—Melvyn Andrews
*Attorney, Agent, or Firm*—David M. Rosenblum; Larry R. Cassett

[57] ABSTRACT

A method of heating a melt containing an oxidizable substance in which a fuel is burned with an oxidant by projecting fuel oxidant jets over the melt. The fuel and the oxidant jets have a fuel jet momentum and an oxidant jet momentum, respectively. The oxidant jet produces a top oxidation layer on the top surface of the melt and such top oxidation layer has a thickness. The oxidant jet momentum is adjusted to be below a threshold momentum at which the top oxidation layer is forces aside by the oxidant jet to expose fresh melt that potentially can be oxidized and can increase the thickness of the top oxidation layer. The fuel-jet momentum is adjusted so that it is greater than the oxidant jet momentum to draw the oxidant jet towards the fuel jet and thereby forms a desired combustible mixture in a mixing layer. Additionally, the oxidant and fuel jet momentums could be adjusted so that their total momentum (the sum of their individual momentums divided by the power output developed by the burner of the fuel) were less than about 60 newtons per megawatt.

6 Claims, 2 Drawing Sheets

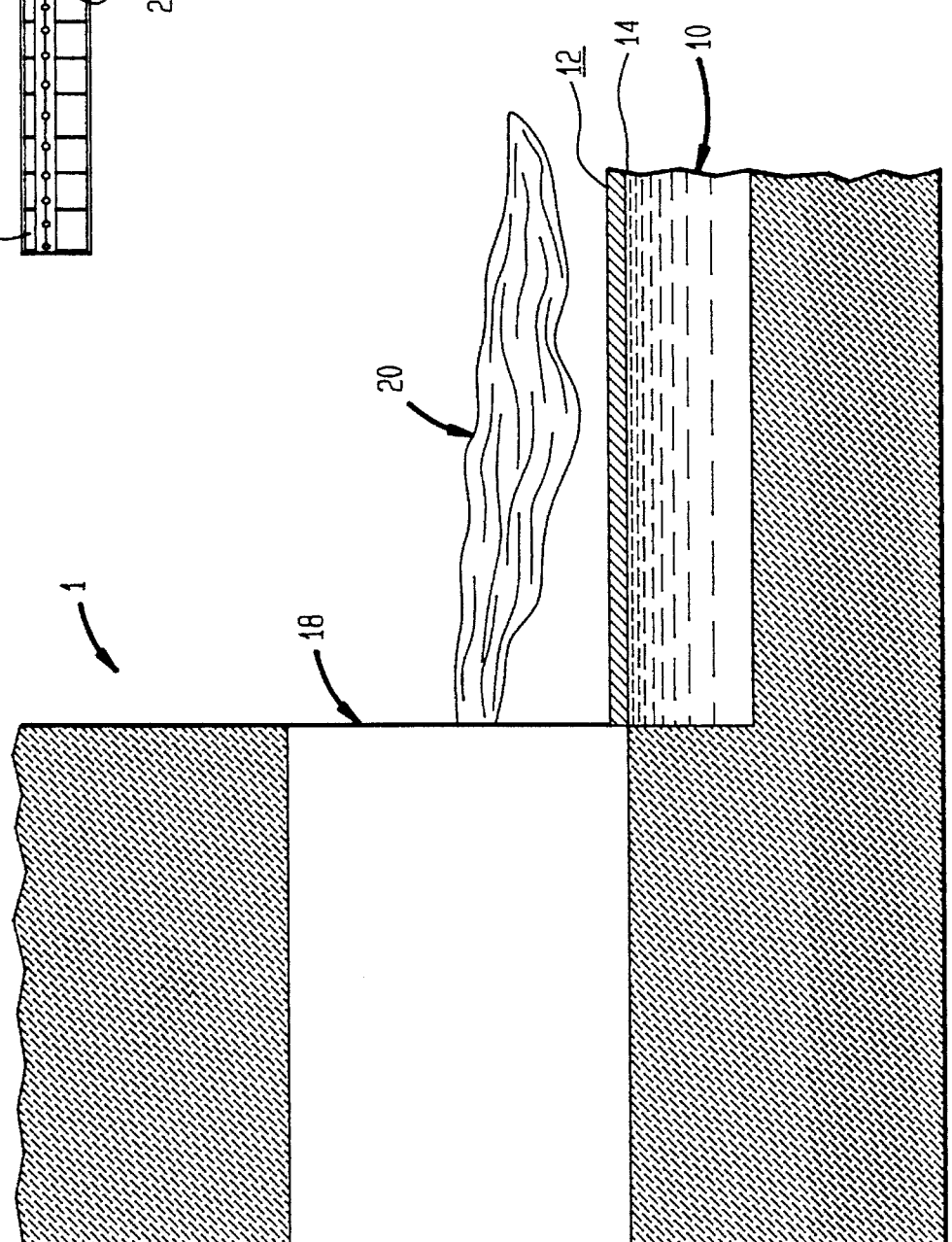

MELT HEATING METHOD

RELATED APPLICATIONS

This application is a continuation-in-part of U.S. patent application Ser. No. 08/376,278, filed Jan. 23, 1995, now abandoned.

BACKGROUND OF THE INVENTION

The present invention relates to a method of heating a melt containing an oxidizable substance. More particularly, the present invention relates to such a method in which the fuel is burned in an oxidant by projecting a fuel jet and an underlying oxidant jet over the melt. Even more particularly, the present invention relates to such a method in which the oxidant jet momentum is controlled so that the top surface of the melt is sufficiently undisturbed that the melt situated beneath the top surface does not rise to the top surface to become oxidized.

The prior art has provided burners in which fuel is burned within an oxidant, oxygen enriched air or nearly pure oxygen to produce a projected flame over the melt. In many such burners, the oxidant is supplied by an oxidant jet positioned below a fuel jet so that the oxidant jet is located between the melt and the fuel jet. In an attempt to project the flame, a high momentum is imparted to the underlying oxidant jet. Typically, however, a high temperature region is produced beneath the flame that contains oxygen. In case of an oxidizable melt such as aluminum, the top surface of the oxidizable melt competes with the fuel for the oxygen to produce a top oxidation layer, known in the art as dross. This top oxidation layer insulates the melt from the flame and, as a result, the power being delivered by the flame to the melt decreases. This in turn increases the amount of fuel required to heat the melt a specified amount.

As will be discussed, the present invention provides a melt heating method which acts to inhibit growth of the top oxidation layer and therefore the insulation provided by such top oxidation layer.

SUMMARY OF THE INVENTION

The present invention provides a method of heating a melt containing a oxidizable substance. In accordance with the method, fuel is burned with an oxidant by projecting at least one pair of fuel and oxidant jets over the melt. The oxidant jet is at least partially situated between the fuel jet and the melt. The fuel and oxidant jets have a fuel jet momentum and an oxidant jet momentum, respectively, and the oxidant jet produces a top oxidation layer located on the top surface of the melt and having a thickness. A threshold momentum is determined at which said top oxidation layer is forced aside by said oxidant jet to expose fresh melt that could potentially be oxidized and increase said thickness of said top oxidation layer. The oxidant jet momentum is adjusted to be below the threshold momentum. The fuel jet momentum is adjusted so that it is greater than the oxidant jet momentum to draw the oxidant towards the fuel and thereby form a desired combustible mixture in a mixing layer of the fuel and oxidant.

In another aspect, the present invention provides a method of heating a melt containing a oxidizable substance. In accordance with the method, fuel is burned with an oxidant by projecting at least one pair of fuel and oxidant jets over the melt. The oxidant jet is at least partially situated between the fuel jet and the melt. The fuel and oxidant jets have a fuel jet momentum and an oxidant jet momentum, respectively, and the oxidant jet produces a top oxidation layer located on the: top surface of the melt and having a thickness. The oxidant jet is projected so that the oxidant jet momentum is below a threshold momentum at which said top oxidation layer is forced aside by said oxidant jet to expose fresh melt that could potentially be oxidized and increase said thickness of said top oxidation layer. The fuel jet is projected so that the fuel jet momentum is greater than the oxidant jet momentum to draw the oxidant towards the fuel and thereby form a desired combustible mixture in a mixing layer of the fuel and oxidant. In still a further aspect, the fuel and oxidant jets have a total specific momentum that is defined by a sum of the fuel and oxidant jet momentums divided by the power produced by the burning of the fuel. In accordance with this further aspect of the present invention it is further provided that the oxidant and fuel jets are projected so that their said total momentum will be no greater than about 60 newtons per megawatt of power produced from said burning of the fuel.

In its broadest aspect, the present invention has application to many different types of burner designs. For instance, in case of a burner in which a central fuel nozzle is surrounded by an outer coaxial array of oxidant nozzles, the resultant oxidant jet will only partially lie beneath the fuel jet. Other burners, such as discussed above, have an oxidant jet underlying the fuel jet so that the oxidant jet is entirely situated between the fuel jet and the melt. Still other burners having overlying and underlying oxidant jets sandwiching a central fuel jet. The claims of this case are intended in their broadest aspect to cover all of these types of burners. Furthermore, it is important to point out that the term "oxidant" as used herein and in the claims means oxygen, oxygen enriched air or air.

The inventor herein has determined that a specific threshold momentum of the oxidant jet exists in which the oxidant jet forces the top oxidized layer aside to expose fresh or unoxidized melt which becomes oxidized. For instance, the top oxidation layer may in its entirety slide in a direction of flow of the oxidant jet or may cause one or more fissures to develop in the top oxidant layer. The term, "forced aside" as used herein and in the claims is meant to cover all of these possibilities. The threshold momentum of the oxidant depends on many factors including any possible deflection of the oxidant jet towards the melt and distance of the oxidant jet from the melt. As momentum is increased, there exists an increase in momentum transport to the melt which is churned so that the melt underlying the top oxidized layer tends to transport to the surface and become oxidized. These aforementioned mechanisms cause growth of the thickness of the top oxidation layer from the top surface of the melt. The growth, however, in the top oxidation layer is initiated by the forcing aside of the top oxidation layer. The present invention does not prevent formation of the top oxidation layer. It, does however, inhibit growth of the thickness of such layer by not disturbing the top surface of the melt.

In practice of the present invention, as the melt heats, the oxidant jet momentum is adjusted to be below the threshold momentum. The fuel jet momentum is adjusted so that it draws the oxidant jet towards the fuel and produces a "desired combustible mixture" in the mixing layer. Such desired combustible mixture is the mixture required for a specific desired power output. Since the oxidant is being drawn towards the fuel, it is being drawn away from the melt to lower the oxygen concentration over the melt. The lower oxygen concentration also acts to inhibit the growth of the thickness of the melt.

The threshold momentum can be determined experimentally by observing the top oxidation layer after the melt has been heated. Initially, as the melt heats, the oxidant jet momentum is adjusted so that so that the top surface of the melt appears to be undisturbed by the oxidant jet. Thereafter, while observing the top oxidation layer the momentum of the oxidant jet is increased until a disruption in or a movement of the top oxidant layer occurs. As indicated above, the present invention may be practiced by setting up the combustion so that the top oxidant layer is not disrupted. Once set up, the set up conditions could be noted and a burner used in heating the melt could be adjusted between turn down operation and operation in accordance with the present invention. The present invention could be practiced as outlined above. However, in order to have even further assurance that the top oxidation layer of the melt were not disturbed, the total specific momentum of the fuel and oxidant jets could be calculated at the exit of the burner and the fuel an oxidant jets could be adjusted to be at or below about 60 newtons per megawatt of power developed by the burner. Since the oxidant jet momentum and/or the total specific momentum is a limiting factor when heating a melt in accordance with the present invention, one single burner might not have enough power output for the heating requirements of in specific melt. As such, the present invention contemplates the use of several burners producing several pairs of fuel and oxidant jets or using burners which dissipate the oxygen momentum over short distances from the burner.

DESCRIPTION OF THE DRAWINGS

While the present invention concludes with claims distinctly pointing out the subject matter that Applicant regards as his invention, it is believed that the invention will be better understood when taken in connection with the accompanying drawings in which:

FIG. 1 is a sectional view of a furnace incorporating a heating method in accordance with the present invention;

FIG. 2 is a front view of a burner operating in accordance with the present invention;

DETAILED DESCRIPTION

Figures 3, 4:
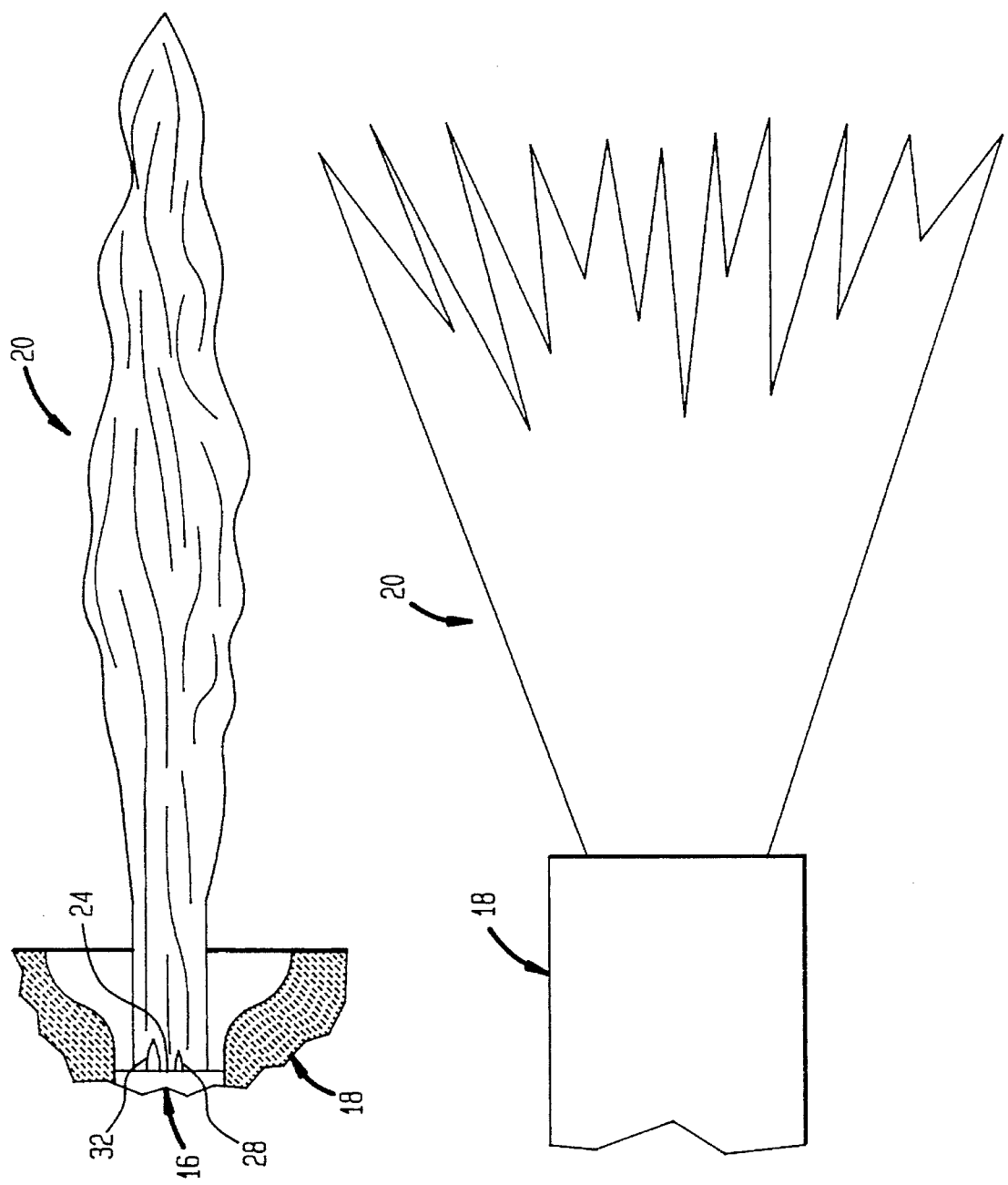
FIG. 3 is an elevation, cross-sectional view of a burner operating in accordance with a method of the present invention.
FIG. 4 is a fragmentary, top plane view of FIG. 3.

With reference FIGS. 1 and 2 a furnace 1 is illustrated for heating a melt 10 which comprises an oxidizable substance, for instance, aluminum. Melt 10 has a top surface 12 and a top oxidation layer 14 which in the case of aluminum is known as aluminum dross. The thickness of top oxidation layer 14 is exaggerated for purposes of illustration. In reality, such top oxidation layer would be a few millimeters thick.

Furnace 1 incorporates burner 16 set within a burner block 18. Burner 16 is designed to burn a fuel within an oxidant, either oxygen or oxygen enriched air, to produce a projected flame 20 which overlies melt 10. Heat is transferred from projected flame 20 to melt 10.

With additional reference to FIGS. 3, burner 16 is provided with a central fuel nozzle 22 that is specifically designed to discharge a fuel jet 24 in an outwardly divergent, fan-shaped configuration. With reference to FIG. 4, such outwardly divergent, fan-shaped configuration is fully illustrated for projected flame 20. Situated beneath fuel nozzle 22 is an underlying oxidant nozzle 26 which is designed to produce an outwardly divergent, fan-shaped underlying oxidant jet 28 which is positioned between melt 10 and fuel jet 24. Also provided is an overlying oxidant nozzle 30 which is designed to produce an outwardly divergent, fan-shaped overlying oxidant jet 32. It is to be noted that overlying oxidant nozzle 30 has a smaller cross-sectional area than underlying oxidant nozzle 26 so that overlying oxidant jet 30 has less momentum than underlying oxidant jet 28 and functions to prevent projected flame 20 from licking up toward the roof the furnace. Overlying oxidant nozzle 30 could be constructed with the, same cross-sectional area as underlying oxidant nozzle 26. Burner 16 is fully illustrated and described in U.S. Pat. No. 5,299,929, issued to the Assignee herein and which is hereby incorporated by reference. However, it is to be stated that no particular type of burner is preferred and the method is applicable to any burner in which an oxidant, such as air, oxygen enriched air, or pure oxygen is introduced as a jet below a fuel jet and over a melt.

As stated previously, the momentum of the oxidant, in this case oxygen, is adjusted via a valve 34 to be below a threshold momentum, discussed hereinabove. Practically speaking, adjustment of valve 34 adjusts the velocity of underlying oxidant jet 28. Thereafter, a fuel valve 36 is adjusted to adjust the velocity of fuel jet 24 and therefore its momentum. The momentum of fuel jet 24 is adjusted to be greater than the momentum of underlying oxidant jet 28 so that the fuel jet 24 produces a low pressure region that draws the oxidant away from melt 10 and towards the fuel to form a desired combustible mixture in the mixing layer of the fuel and the oxidant. Additionally, as mentioned above, the total specific momentum of fuel and oxidant jets 24 and 28 could be calculated. In such case it might also be necessary to scale back the total specific momentum of fuel and oxidant jets to about or below about 60 newtons per megawatt of power developed by burner 16.

While the invention has been described with reference to a preferred embodiment, it will occur to those skilled in the art that numerous changes, additions, and omissions may be made without departing from the spirit and scope of the present invention.

I claim:

1. A method of heating a melt containing an oxidizable substance, said method comprising:

burning fuel with an oxidant by projecting at least one pair of fuel and oxidant jets over the melt, said oxidant jet being at least partially situated between said fuel jet and said melt;

said fuel and oxidant jets having a fuel jet momentum and an oxidant jet momentum, respectively, and said oxidant jet producing a top oxidation layer located on said top surface of said melt and having a thickness;

determining a threshold momentum at which said top oxidation layer is forced aside by said oxidant jet to expose fresh melt that could potentially be oxidized and increase said thickness of said top oxidation layer;

adjusting said oxidant jet momentum to be below said threshold momentum; and adjusting said fuel jet momentum so that it is greater than said oxidant jet and said oxidant and fuel form a desired combustible mixture in a mixing layer of the fuel and oxidant.

2. A method of heating a melt containing an oxidizable substance, said method comprising:

burning fuel with an oxidant by projecting at least one pair of fuel and oxidant jets over the melt, said oxidant jet being at least partially situated between said fuel jet and said melt;

said fuel and oxidant jets having a fuel jet momentum and an oxidant jet momentum, respectively, and said oxidant jet producing a top oxidation layer located on said top surface of said melt and having a thickness;

said oxidant jet being projected so that said oxidant jet momentum is below a threshold momentum at which said top oxidation layer is forced aside by said oxidant jet to expose fresh melt that could potentially be oxidized and increase said thickness of said top oxidation layer; and said fuel jet being projected so that said fuel jet momentum is greater than said oxidant jet momentum and said oxidant and fuel form a desired combustible mixture in a mixing layer of the fuel and oxidant.

3. A method of heating a melt containing an oxidizable substance, said method comprising:

burning fuel with an oxidant by projecting at least one pair of fuel and oxidant jets over the melt, said oxidant jet being at least partially situated between said fuel jet and said melt;

said fuel and oxidant jets having a fuel jet momentum and an oxidant jet momentum, respectively, said fuel and oxidant jets having a total specific momentum defined by a sum of said fuel and oxidant jet momentums divided by the power output of the burning of the fuel, and said oxidant jet producing a top oxidation layer located on said top surface of said melt and having a thickness;

said oxidant jet being projected so that said oxidant jet momentum is below a threshold momentum at which said top oxidation layer is forced aside by said oxidant jet to expose fresh melt that could potentially be oxidized and increase said thickness of said top oxidation layer;

said fuel jet being projected so that said fuel jet momentum is greater than said oxidant jet momentum and said oxidant and fuel form a desired combustible mixture in a mixing layer of the fuel and oxidant; and said oxidant and fuel jets being projected so that their said total specific momentum will be no greater than about 60 newtons per megawatt of power produced from said burning of said fuel.

4. The method of claim 1 or claim 2 or claim 3, wherein said fuel and oxidant jets each have a divergent, fan-shaped configuration.

5. The method of claim 4, further comprising producing an overlying oxidant jet overlying said fuel jet so that said fuel jet is sandwiched between said over and underlying oxidant jets.

6. The method of claim 1 or claim 2 or claim 3, wherein said melt comprises aluminum.

* * * * *